(12) United States Patent
Hilzendegen et al.

(10) Patent No.: US 10,871,177 B2
(45) Date of Patent: Dec. 22, 2020

(54) DISCHARGE PRESSURE SCALE AND LIFTING-LOWERING DEVICE HAVING A DISCHARGE PRESSURE SCALE OF THIS TYPE

(71) Applicant: HYDAC FLUIDTECHNIK GMBH, Sulzbach/Saar (DE)

(72) Inventors: Philipp Hilzendegen, Wadern (DE); Markus Bill, Heusweiler (DE); Maximilian Felix Hess, Saarbruecken (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 0 days.

(21) Appl. No.: 16/340,799

(22) PCT Filed: Aug. 31, 2017

(86) PCT No.: PCT/EP2017/001034
§ 371 (c)(1),
(2) Date: Apr. 10, 2019

(87) PCT Pub. No.: WO2018/068876
PCT Pub. Date: Apr. 19, 2018

(65) Prior Publication Data
US 2019/0249693 A1    Aug. 15, 2019

(30) Foreign Application Priority Data
Oct. 13, 2016   (DE) .................. 10 2016 012 261

(51) Int. Cl.
*F15B 13/04*    (2006.01)
*F15B 11/05*    (2006.01)
(Continued)

(52) U.S. Cl.
CPC .......... *F15B 13/0417* (2013.01); *F15B 11/05* (2013.01); *F15B 13/01* (2013.01);
(Continued)

(58) Field of Classification Search
CPC ................ F15B 13/026; F15B 13/0417; F15B 2211/40515; F15B 11/05; F15B 13/0405
See application file for complete search history.

(56) References Cited

U.S. PATENT DOCUMENTS

| 4,811,649 A | 3/1989 | Heusser |
| 7,261,030 B2 | 8/2007 | Liberfarb |

FOREIGN PATENT DOCUMENTS

| DE | 37 05 170 | 8/1988 |
| DE | 44 23 644 | 1/1996 |

(Continued)

OTHER PUBLICATIONS

International Search Report (ISR) dated Nov. 24, 2017 in International (PCT) Application No. PCT/EP2017/001034.

*Primary Examiner* — Abiy Teka
(74) *Attorney, Agent, or Firm* — Wenderoth, Lind & Ponack, L.L.P.

(57) ABSTRACT

A discharge pressure scale (30) includes a valve housing (41) having a functional connector (A), a return flow connector (T) and a user connector (28). A valve piston (52) is guided such that it moves longitudinally against the effect of an energy accumulator (42), moving from a respective opening or regulating position, against a valve seat (94), into a closed position. The user connector (28) and return flow connectors (T) are separated from one another. The fluid pressure present at the user connector (28) can be guided onto a pressure-active surface ($A_1^*$) of the valve piston (52) by a pressure compensation device (70) in such a way that it moves into its respective opening or regulating position in (Continued)

a pressure-compensated manner due to the force of the energy accumulator (42).

15 Claims, 2 Drawing Sheets

(51) Int. Cl.
    *F15B 13/01*            (2006.01)
    *F15B 13/02*            (2006.01)
    *G05D 16/20*           (2006.01)
    *F15B 13/00*            (2006.01)

(52) U.S. Cl.
    CPC ........ *F15B 13/026* (2013.01); *F15B 13/0405* (2013.01); *G05D 16/2024* (2019.01); *F15B 2013/004* (2013.01); *F15B 2211/3055* (2013.01); *F15B 2211/40515* (2013.01); *F15B 2211/40569* (2013.01); *F15B 2211/41554* (2013.01); *F15B 2211/41563* (2013.01); *F15B 2211/41581* (2013.01); *F15B 2211/426* (2013.01); *F15B 2211/46* (2013.01); *F15B 2211/465* (2013.01); *F15B 2211/8606* (2013.01); *F15B 2211/8613* (2013.01)

(56) References Cited

FOREIGN PATENT DOCUMENTS

| | | | |
|---|---|---|---|
| DE | 41 19 297 | 7/2000 | |
| DE | 102013206973 A1 * | 10/2014 | ......... G05B 13/0245 |
| EP | 0 893 607 | 1/1999 | |
| EP | 2 551 571 | 1/2013 | |

\* cited by examiner

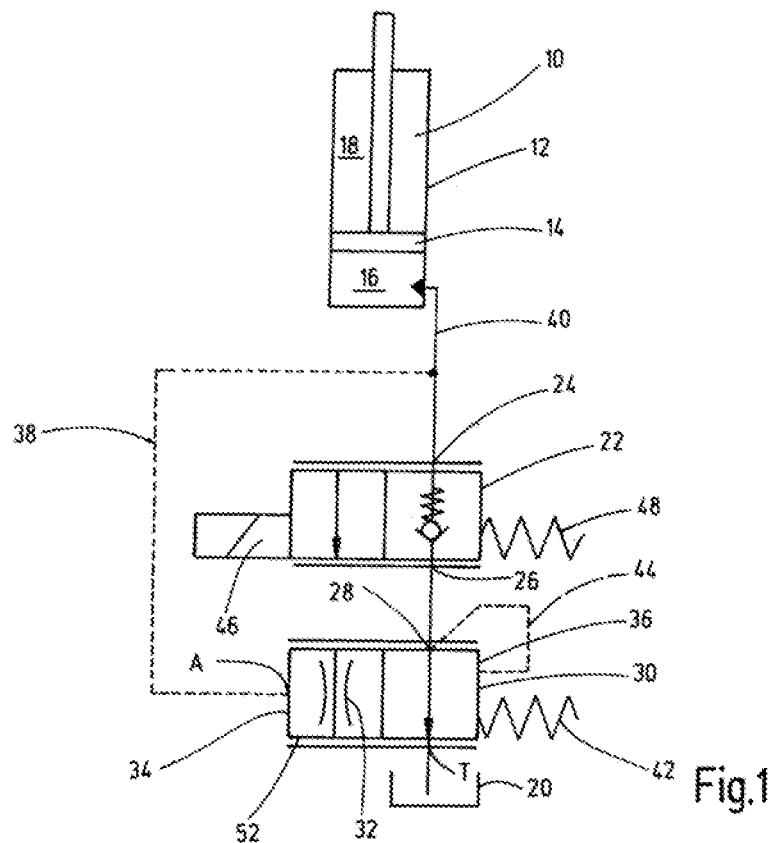
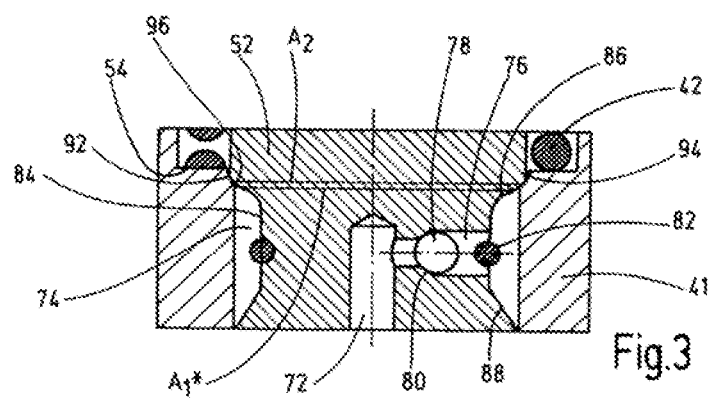

DISCHARGE PRESSURE SCALE AND LIFTING-LOWERING DEVICE HAVING A DISCHARGE PRESSURE SCALE OF THIS TYPE

FIELD OF THE INVENTION

The invention relates to a discharge pressure maintenance component, including at least one valve housing having at least three fluid connection ports in the form of a use port, a return port and a control port. A valve piston is longitudinally movably guided against the action of an energy storage device, and travels, starting from an individual opening or regulating position, against a valve seat into a closed position, in which the control port and the return port are separated from each other.

BACKGROUND OF THE INVENTION

For hydraulic control devices having a two-way flow regulator in a drain line towards the tank, the flow regulator has an orifice disk and a pressure maintenance component having a regulating piston. On the piston ends of control pressures can be applied in the control chambers. Shift jerking frequently cannot be avoided when hydraulic motors are operated unilaterally against a load because the regulating piston consumes a certain volume of pressure medium for travel, or complex structural and circuitry measures are required to minimize shift jerking.

To avoid the shift jerking with little structural effort, in a known solution according to DE 37 05 170 C1, the piston end of the regulating piston exposed to pressure is formed as a closing element. The closing element, in conjunction with an associated valve seat acts as a poppet valve holding the load pressure. Further, a blocking element is provided in the discharge line, which keeps the load pressure away from the passage of the pressure maintenance component. Upon leaving the shut-off position, shift jerking is prevented because the poppet valve in the pressure maintenance component having the blocking element holds the load without loss of pressure medium. Because the regulating piston is held in the shut-off position, no lost pressure medium has to be replenished for controlling the regulating orifice. Although in this known solution, a load pressure-retaining poppet valve is realized, a certain leakage flow still occurs, in particular on the load tap of the pressure maintenance component. This flow impairs the functional reliability of the known solution.

Furthermore, mobile machines having lift-lowering applications, such as those commonly found on telehandlers, forklifts or lifting platforms, are commercially available. In such solutions, a proportional flow regulation is often used to lower a load. That flow regulation in turn is supposed seal leak-free in the closed state, in order to prevent an unintended lowering of the load in this way.

In these known solutions, the proportional flow control function is normally implemented by a proportional throttle valve and a pressure maintenance component. The pressure maintenance component assumes the task of keeping the pressure difference constant by the proportional throttle. Regardless of fluctuating load or cylinder pressures, a constant volume flow is regulated in this way. To achieve a good control quality, the pressure maintenance component ideally "senses" the load or cylinder pressure and regulates accordingly on the discharge side of the proportional valve.

If this valve constellation is supposed to seal leak-free, then the proportional throttle closes tightly sealed. Still, there is a certain leakage flow via the load tap of the pressure maintenance component. To eliminate this leakage flow, usually sealing elements, such as O-rings or alternative movement seals, are used. These seals however, lead to performance disadvantages that are usually not accepted in the practical application of such systems. In closing a valve seat, differential surfaces develop. After a certain service lifetime also additional irregular impressing surfaces adversely affect the function of the pressure maintenance component, especially at high load pressures. In particular for smaller mobile machines, such as forklifts, which usually have to hold the load in a specified position only for a short time, such leakage is simply accepted as technically inevitable. In contrast, heavier elevating work platforms can support their load on additional check valves, which, however, are again subject to defects and result in a significant increase in cost.

Furthermore, solutions are known in the prior art, as shown in U.S. Pat. No. 7,261,030 B2, which are, however, based on a different circuit diagram concept. In the known solution according to this US patent, the pressure maintenance component, does not as usual, sense the load on the individual consumer and regulates accordingly. A pressure regulating valve is inserted upstream of the proportional valve, which pressure regulating valve regulates the pressure in front of the proportional throttle to a certain level. This insertion results in a very complex design of the valve and also in a massive dependence on the flow force. In comparison with other solutions in the prior art, very high flow resistances and a delayed response to load pressure fluctuations result, which leads to a poorer control behavior overall.

SUMMARY OF THE INVENTION

Based on this prior art, the invention addresses the problem of further improving the known discharge pressure maintenance components to the effect that the pressure maintenance component travels to a closed state in a tightly sealing position, and thus, certainly prevents a leakage flow from the load side to the tank.

The invention also addresses the problem of improving the safety of known lifting-lowering devices.

This problem is basically solved by a discharge pressure maintenance component having a generic discharge pressure maintenance component. The fluid pressure existing at the control port is routed to a pressure-effective surface of the valve piston by a pressure compensation device such that the valve piston reaches its respective opening or control positions in a pressure-balanced manner solely due to the force of the energy storage device.

The aim of the invention is to obtain a tightly sealing pressure maintenance-type component. As for load pressures greater than the spring force (usually less than 15 bar), the regulating or valve piston is pressed all the way down for a vertical orientation of the pressure maintenance component. A valve seat can basically be integrated here. The regulating or valve piston then finds a stop in this way and seals leak-free at the seat. However, in practice it turned out that even the slightest irregular impressions on the valve seat create, due to the associated differential surfaces, pressure conditions, which no longer permit the regulating or valve piston to be opened safely. Such irregular impressions, which result in varying seating and sealing geometries, are due to the fact that the valve piston of the pressure maintenance component during operation constantly strikes against the associated seat components in the valve housing and plastically deforms the valve components in this area.

However, as the regulating or valve piston obstructs the drain to the return port or tank port in the sealing position, a pressure maintenance component can be used to establish pressure compensation in the piston after the proportional valve has opened, preferably in the form of a drilled hole. Then, the valve even opens if the seat shows irregular impressions. In order to prevent a larger leakage from causing a distortion of the load pressure in normal operation, a check valve for pressure compensation is additionally integrated in the relevant drilled hole or the pressure compensation channel. In this way, pressure is only passed on when the valve is "in the seat" and compensation is required.

According to the invention a discharge pressure maintenance component is provided, which seals leak-free in a pre-determinable end position and, for instance, can be used to implement pressure compensation at the valve seat within the scope of a connected lifting-lowering device according to the invention. This is without parallel in the prior art.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are schematic and not to scale:

FIG. 1 is a hydraulic circuit diagram of major parts of a lifting-lowering device according to an exemplary embodiment of the invention;

FIG. 3 is an enlarged side view in section of the image detail B in FIG. 2.

DETAILED DESCRIPTION OF THE INVENTION

Figure 2:
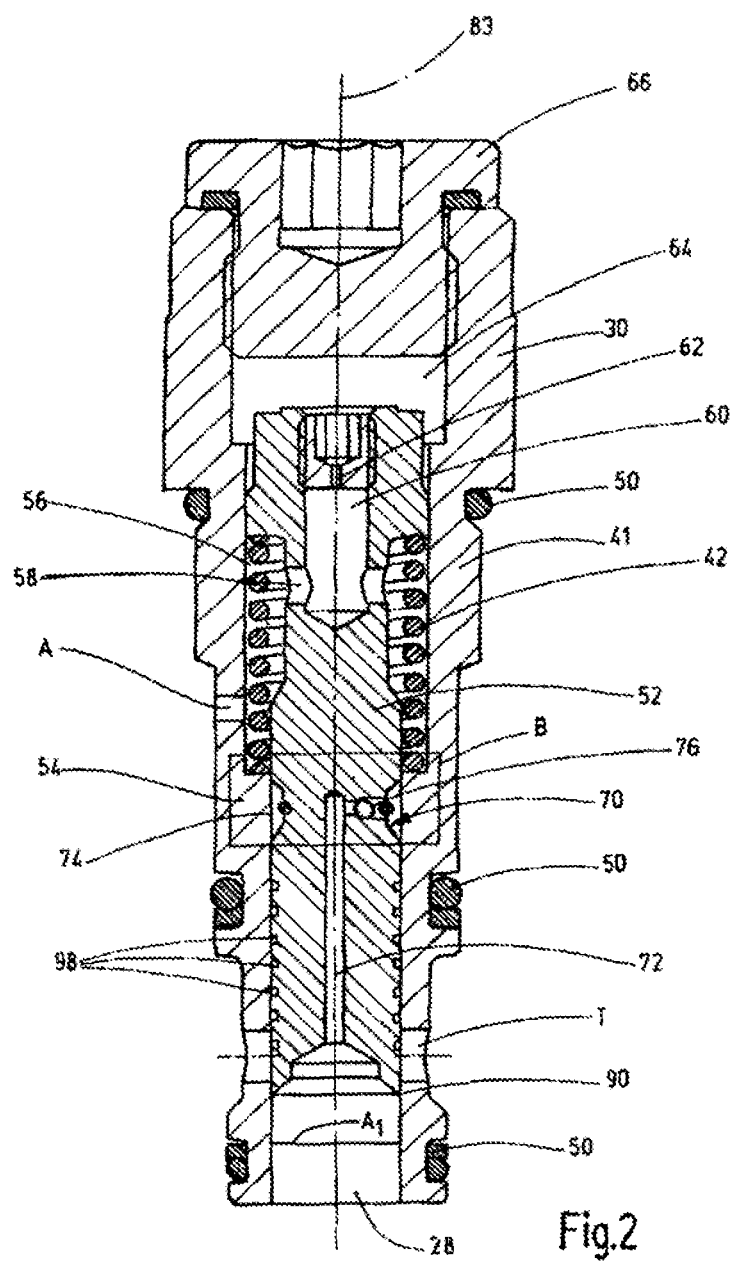
FIG. 2 is a side view in section of a discharge pressure maintenance component according to exemplary embodiment of the invention.

The hydraulic circuit diagram of FIG. 1 shows a hydraulic power cylinder 10, as it is regularly used for lifting and lowering applications, for instance in telehandlers, forklifts or lifting platforms. The power cylinder 10 has a longitudinally displaceable piston rod unit 14 in a housing 12, which unit divides the power cylinder 10 within the housing 12 into a piston chamber 16 and a rod chamber 18. A controllable motor pump unit, which lets fluid flow under pressure into the piston chamber 16, is used to extend the piston-rod unit 14 from the housing 12 of the power cylinder 10, for instance, for lifting a load. In this case, fluid is displaced via the rod chamber 18, which fluid is routed to a storage tank 20 via a suitable drain device. This type of control of power cylinders 10 for lifting-lowering applications is common in the prior art, i.e. will not be discussed in detail at this point.

Among other things, a proportional throttle valve 22 has inlet 24 permanently connected to the piston chamber 16 of the power cylinder 10 in a fluid-conveying manner, and is used to lower the piston-rod unit 14 in the housing 12. This proportional throttle valve 22 has an adjustable measuring orifice disk, which is common in the prior art. The outlet 26 of the valve 22 is in turn connected to the user port or inlet 28 of a pressure maintenance component 30, which has a regulating orifice disk 32 in the usual way and which is also referred to as a discharge pressure maintenance component, because it regulates the flow of fluid from the piston chamber 16 of the power cylinder 10 upon lowering the piston rod unit 14. The discharge pressure maintenance component 30 has two opposite control sides 34, 36. As viewed in the direction of FIG. 1, the left or first control side 34 is connected to a connecting line 40 between the piston chamber 16 and the inlet 24 of the proportional throttle valve 22 via a control line 38 depicted as a dashed line. The load pressure of the power cylinder 10 is consequently transmitted via a control port A in the valve housing 41 of the pressure maintenance component 30. On the opposite right-hand or second control side 36, a compression spring 42 acts as an energy storage device. Another control line 44 (shown as a dashed line) transmits the control pressure 10 existing at the inlet 28 of the discharge pressure maintenance component 30 to the right control side 36. The outlet of the pressure maintenance component 30 forms the return port or tank port T, which leads to the storage tank 20.

The proportional throttle valve 22 shown in FIG. 1 using the usual switching symbol can be electromagnetically actuated via a control device 46 and can be held in its shown blocking position by a further pressure spring 48 as energy storage device.

Taken as a whole, to lower a load by the power cylinder 10, a proportional flow control function is implemented using the proportional throttle valve 22 and the discharge pressure maintenance component 30. For this purpose, the pressure maintenance component 30 takes over the task of keeping the pressure difference constant across the proportional throttle. Regardless of fluctuating load pressures or cylinder pressures, a constant volume flow is regulated in this way. To achieve a good quality of regulation, the pressure maintenance component 30 ideally routes the load pressure or cylinder pressure to the pressure-effective surface 36 of the regulating piston when the proportional throttle valve 22 is actuated via the further control line 44.

FIG. 1 shows the structure of a lifting-lowering device only in principle. Several cylinders 10 can be used for a lifting-lowering application having flow regulation devices for every cylinder 10 or using a joint flow regulation device for several cylinders 10. If the presented valve constellation having a proportional valve 22 and a pressure maintenance component 30 is to seal in a leak-free manner to prevent an unintentional lowering of the piston-rod unit 14 in the housing 12 of the power cylinder 10, the prior art has the proportional throttle valve 22 terminating in a tightly sealed manner. However, a certain leakage flow, which results in an unwanted lowering of the piston-rod unit 14 during operation of the power cylinder 10 during lifting-lowering applications, nevertheless occurs via the mentioned load tap of the pressure maintenance component. The invention intends to remedy this, which will be explained in more detail below with reference to the valve structure of FIGS. 2 and 3. The previously introduced reference numerals together with the accompanying explanations are used accordingly, to the extent to which the same parts and components are meant, as explained above.

FIG. 2 as a whole shows the valve structure for the discharge pressure maintenance component 30. The valve housing 41 of the pressure maintenance component is designed in a stepped manner as shown in FIG. 2, such that the pressure maintenance component 30 can be used as an insert or cartridge valve in assignable valve blocks or valve components (not shown). For sealing against these third structure components, sealing rings or sealing ring packages 50 are inserted on the outer circumference of the valve housing 41 in recesses provided for this purpose. As viewed in the direction of the FIG. 2 downwards, a cylindrical recess in the form of the inlet 28 of the pressure maintenance component 30 is introduced at the front side into the valve housing 41, which inlet is also referred to as user port 28. Arranged above user port 28 is the tank port or return port T, which has a plurality of mutually diametrically opposed drilled holes extending at the same height and passing through the wall of the valve housing 41 in the radial direction. Above tank port T, there is at least one (use) connection port A, which in turn is introduced into the valve housing 41 via a radial dilled hole. According to the illustration according to FIG. 1, the pressure is present behind the proportional valve 22 at the inlet 28 of the pressure maintenance component 30. The return port T is routed to the storage tank 20, which normally has tank or ambient pressure. The control connection port A is in turn connected to the piston chamber 16 of the power cylinder 10 in a permanently fluid-conveying manner via the control line 38 and the connecting line 40.

Within the valve housing 41 a regulating or valve piston 52 is guided longitudinally movably, which piston rests against the compression spring 42 as the one energy storage device according to the illustration of FIG. 2. The other lower free end of this compression spring 42 rests against an inward projection 54 in the valve housing 41. The compression spring 42 is supported in a spring chamber 56 within the valve housing 41. This spring chamber 56 is connected in a fluid conveying manner to the connection port A in every position of the valve piston 52 and to an antechamber 60 at the upper end via a transverse connection 58 in the form of radial drilled holes in the valve piston 52. Antechamber 60 opens in turn via a damping device 62 in the form of an orifice disk or throttle into a damping chamber 64 in the interior of the valve housing 41. This damping chamber 64 is closed at the top in a sealing manner by a closing part 66, which can be screwed into the interior of the valve housing 41 there. The damping device 62 is designed as a screw-in part in the valve piston 52. The respective screw can have different throttle or orifice disk diameters, such that the intended valve damping can be adapted to a variety of such valve designs for a discharge pressure maintenance component 30 in an apparent manner.

Furthermore, the pressure maintenance component 30 according to the invention is provided with a pressure compensation device or pressure compensator 70. This pressure compensation device 70 has a pressure compensation channel 72. The one free, lower end of channel 72 is centrally guided or extends at the lower end of the valve piston 52 in the direction of the connection port or the valve inlet 28. The other free end of channel 72 opens in an annular channel 74, which is introduced in the valve piston 52 at the outer peripheral side. The pressure compensation channel 72 in the form of the centrally disposed longitudinal drilled hole in the valve piston 52 further comprises a transverse drilled hole 76 as a transverse channel, which in turn opens in the annular channel 74 as part of the channel 72. In this case, a valve ball 78 is inserted in the transverse channel or the transverse drilled hole 76, which ball acts in the manner of a check valve. In a traversing movement, viewed in the direction of FIGS. 2 and 3, from left to right, valve ball 78 opens a channel cross-section in the transverse drilled hole 76, such that in the opening or open position, a first throttled fluid-conveying connection between the pressure equalizing channel 72 and the annular channel 74 is established. For this purpose, the diameter of the transverse drilled hole 76 outside the range of the seat system 80 of the valve ball 78 on the valve piston 52 is widened, in particular provided with a larger diameter than the valve ball 78. To prevent the valve ball 78 from unintentionally leaving the transverse drilled hole 76, its position is secured within the transverse drilled hole 76 by a retaining ring 82, which may be formed of a metallic locking ring. Ring 82 encompasses the valve piston 52 in the horizontal plane and transversely to the longitudinal or longitudinal axis 83 of the valve partially guided in a corresponding recess. This locking ring can safely counteract the expelling compressive forces acting on the ball 78. These conditions are evident from the enlarged representation of FIG. 3, which is an enlarged view of the rectangular section B in FIG. 2.

As further shown in particular in FIG. 3, the annular channel 74, as viewed in the cross section shown, has a rectilinear groove bottom 84, which extends in parallel to the longitudinal axis 83 of the pressure maintenance component 30 and into which the transverse drilled hole 76 opens and against which the retaining ring 82 abuts. Starting from this groove bottom 84, the annular channel 74 has a convex course 86 at its upper end. At its opposite lower end annular channel 74 opens via a gradient 88 having a constant gradient onto the outer peripheral side of the valve piston 52. This cross-sectional profile for the annular channel 74 is particularly suitable for the desired control of the valve piston 52, as will be explained in more detail below.

Viewed in the direction of FIG. 2, the valve piston 52 has a cylindrical circumferential control edge 90 at its lower end. Control edge 90 is used to regulate the fluid flow between the inlet 28 and tank port T, as soon as the pressure maintenance component 30 is in one of its "opened" control positions. This control edge 90 forms the regulating orifice disk with the associated radial drilled holes at the port T in the valve body 30. However, in the position shown in FIG. 2, the underside of the valve piston 52 closes this return port or tank port T. Starting from control edge 90, the valve piston 52 tapers inwardly to a transition point where the pressure compensation channel 72 exits in the direction of the inlet 28 of the pressure maintenance component 30. The pressure compensation channel 72 including its transverse drilled hole 76 and annular channel 74 forms the other control line 44 as shown in FIG. 1.

As is further evident in particular from FIG. 3, an obliquely extending seat surface 92 in the valve housing 41 is additionally arranged below the projection 54 in the interior of the valve housing 41 as a contact surface for the lower end of the compression spring 42. Instead of a gradient, the shape of the seat 92 can assume all known valve seat geometries, such as spherical cap, cone, etc. The resulting surface difference results in every type of sealing geometry described above, in which initially a line contact between the two components develops, for the formation of a tightly sealing leak-free valve seat 94. The valve piston 52, at a point of widened diameter, additionally has a contact surface 96, which has a correspondingly inclined design. The seat 92 on the sides of the valve housing 41 is formed larger than the correspondingly arranged inclined contact surface 96 of the valve piston 52, such that valve piston 52 can always easily reach a stop position in the valve housing 41. During operation of the valve, the permanent "abutment" of the valve piston 52 against the valve housing 41 in the region of the valve seat 94 results in irregular impressions on this valve seat 94 that, in conventional pressure maintenance component structures, would result in such pressure conditions on the valve piston 52 that it would no longer easily open against the action of the compression spring 42, as will be explained in more detail below.

In FIGS. 2 and 3, the valve piston 52 is shown in its closed position, in which the lower end of the piston 52 completely covers the tank port or return port T. In this closed position, the convex course 86 of the annular channel 74 opens into the rectilinear contact surface 96 on the valve piston 52 upstream of any possible irregular impressions. The valve seat 94, in particular having a seat surface 92 at the valve housing 41 enlarged beyond the contact surface 96, permits the valve piston 52, after a large number of regulating and closed positions, to find its own "snug fit" at the associated irregular impressions on the seat surface 92 at the valve housing 41. For the purpose of precisely guiding the valve piston 52 in the valve housing 41, it is guided on the outer circumference by correspondingly long guide paths on the inner wall of the valve housing. In particular, the annular grooves 98 introduced in the lower third of the valve piston 52 permit a functionally reliable sealing of the annular channel 74 acted upon by pressure medium against the pressure at the user port or inlet 28 of the discharge pressure maintenance component 30, which is provided by the proportional throttle valve 22 on the outlet side.

Based on pressure-effective surfaces $A_1$, $A_2$ and $A_1^*$ the operation of the pressure maintenance component 30 according to the invention for performing an opening or regulation operation will now be explained in more detail.

The surface $A_1$ at the user port or inlet 28 of the pressure maintenance component 30 (FIG. 2) is delimited by the cylindrical inner wall of the valve housing 41 in the region of the inlet 28. The surface $A_1$ forms the free flow cross section for the inflowing fluid at the inlet 28 of the pressure maintenance component 30. The surface $A_2$ shown in FIG. 3 is formed by the diameter, which results from the impressed annular contact surface as soon as the valve piston 52 assumes its individually impressed valve seat 94. The surface underneath in FIG. 3 $A_1^*$ is again formed by the cross-section, which results at the transition point between the convex course 86 of the annular channel 74 and the contact surface 96 at the valve piston 52.

If the adjustable measuring orifice disc or the proportional throttle valve 22 is opened to allow a volume flow in the direction of the inlet 28 of the pressure maintenance component 30, the same pressure, namely $p=p_{load}$, is present at both two faces $A_1$ and $A_2$, the load pressure $p_{load}$ resulting from the pressure in the piston chamber 16 of every power cylinder 10 connected to the valve assembly described. In that regard, this load pressure $p_{load}$ in the piston chamber 16 is not only transmitted to the inlet 28 of the pressure maintenance component 30 upon the appropriate actuation of the throttle valve 22, but also is transmitted to the (use) port A via the first control line 38 (FIG. 1) thus acting on the valve piston 52 in the opposite direction from the pressure at the inlet 28. As a result of the described irregular impressions or the geometric design of the described valve seat 94, from a structural point of view, the surface $A_2$ is always larger than the surface $A_1$. From this surface difference a closing force component follows that prevents an opening of the valve in the form of the discharge pressure maintenance component 30 against the comparatively low spring force of the compression spring 42. The spring force of the compression spring 42 always acts in the opening direction of the valve piston 52, in which it moves upwards viewed in direction of FIG. 2 to allow a regulating fluid connection between the inlet 28 and the tank port or return port T by the control edge 90.

The pressure compensation channel 72 in the valve piston 52 of the pressure compensation device 70 now permits simultaneously a pressure message of $p=P_{load}$ to the surface $A_1^*$, which has the same design as the surface $A_2$. Thus, the regulating or valve piston 52 is then pressure compensated and the pressure maintenance component 30 can be opened when the throttle valve 22 opens solely due to the spring force of the energy storage device, i.e. the compression spring 42. The check valve having the ball valve 78 provided within the pressure compensation device 70 prevents leakage, starting from port A in the direction of the user port or inlet 28 in the control position of the pressure maintenance component 30. Here, the pressure in the annular channel 74 is always higher than the pressure at the inlet 28, i.e. the check valve can always be kept tightly sealed.

In relation to the damping device 62, the damping or the displacement of the medium occurs via a hydraulic resistance and always via the combination of the orifice disk and the annular gap, which is formed between the piston and the valve body. This arrangement results in the following damping solutions: closed orifice disk; the media flows exclusively via the annular gap or, for a variable orifice disk diameter, a media flow results via orifice disk and annular gap.

The solution according to the invention has provided a discharge pressure maintenance component 30, which seals in the end position shown in FIGS. 2 and 3 against the valve seat 94 without leakage and yet for an attached hydraulic load, for instance according to the exemplary embodiment of FIG. 1, can implement a pressure compensation, as described above, at the valve seat 94 to ensure the control function of the discharge pressure maintenance component 30. This is without parallel in the prior art.

While one embodiment has been chosen to illustrate the invention, it will be understood by those skilled in the art that various changes and modifications can be made therein without departing from the scope of the invention as defined in the claims.

The invention claimed is:

1. A discharge pressure maintenance type component, comprising:
    a valve housing having a user port, a return port and a control port;
    a valve piston guided for longitudinal movement in said valve housing against a force of an energy store from an open position providing fluid communication between said user port and said return port to a closed position blocking fluid communication between said user port and said return port;
    a pressure compensator conveying fluid pressure at said user port to a pressure-effective surface of said valve piston such that said valve piston reaches the open position in a pressure-balanced manner due to the force of said energy store, said pressure compensator having a pressure compensation channel extending through said valve piston, said pressure compensation channel having a first free end opening in said valve housing in a direction of said user port and a second free end opening in an annular channel in said valve piston, said annular channel having said pressure-effective surface; and
    a valve seat in said valve housing with an inclined seat forming a tightly sealed leak-free stop for said valve piston with an included contact surface on said valve piston, said pressure-effective surface having a size equal to said inclined contact surface of said valve piston in an area of said valve seat, and being larger than a control surface at a free end face of said valve piston facing said user port due to an embossing process caused by movement of said valve piston and a geometric configuration of said valve seat.

2. A discharge pressure maintenance component according to claim 1 wherein
said pressure compensation channel extends centrally through said valve piston.

3. A discharge pressure maintenance component according to claim 1 wherein
said annular channel is arranged between said valve seat and said return port in the closed position of said valve piston in said valve housing.

4. A discharge pressure maintenance component according to claim 1 wherein
said pressure compensation channel comprises a drilled longitudinal hole at least one of centrally or eccentrically extending in said valve piston relative to a longitudinal axis of said valve piston and comprises a transverse drilled hole extending transverse to said longitudinal axis between said drilled longitudinal hole and said annular channel; and
a check valve opening in the direction of said annular channel in said transverse drilled hole.

5. A discharge pressure maintenance component according to claim 4 wherein
said annular channel in cross section comprises a rectilinear groove bottom, said transverse drilled hole opens into said rectilinear groove bottom; and
said annular channel has a convex course in a direction of said valve seat at a first axial end thereof and has a bevel at a second axial end with a constant gradient on an outer peripheral side of said valve piston.

6. A discharge pressure maintenance component according to claim 1 wherein
said valve piston comprises a damping device opposite said pressure compensation channel, said damping device including an antechamber closed by an orifice disk or throttle and opening into a spring chamber having a compression spring therein forming said energy storage, said control port opening into said spring chamber in said valve housing.

7. A discharge pressure maintenance component according to claim 6 wherein
said antechamber in said valve piston opens into a damping chamber in said valve housing via said orifice disk or throttle of said damping device.

8. A lifting-lowering device, comprising:
a hydraulic power cylinder;
a proportional throttle valve performing a proportional flow regulating function connected to said hydraulic power cylinder; and
a discharge pressure maintenance component connected at an output side of said proportional throttle valve, said discharge pressure maintenance component including a valve housing having a user port, a return port and a control port,
a valve piston guided for longitudinal movement in said valve housing against a force of an energy store from an open position providing fluid communication between said user port and said return port to a closed position blocking fluid communication between said user port and said return port,
a pressure compensator conveying fluid pressure at said user port to a pressure-effective surface of said valve piston such that said valve piston reaches the open position in a pressure-balanced manner due to the force of said energy store, said pressure compensator having a pressure compensation channel extending through said valve piston, said pressure compensation channel having a first free end opening in said valve housing in a direction of said user port and a second free end opening in an annular channel in said valve piston, said annular channel having said pressure-effective surface, and
a valve seat in said valve housing with an inclined seat forming a tightly sealed leak-free stop for said valve piston with an included contact surface on said valve piston, said pressure-effective surface having a size equal to said inclined contact surface of said valve piston in an area of said valve seat, and being larger than a control surface at a free end face of said valve piston facing said user port due to an embossing process caused by movement of said valve piston and a geometric configuration of said valve seat.

9. A lifting-lowering device according to claim 8 wherein
said pressure compensation channel extends centrally through said valve piston.

10. A lifting-lowering device according to claim 8 wherein
said annular channel is arranged between said valve seat and said return port in the closed position of said valve piston in said valve housing.

11. A lifting-lowering device according to claim 8 wherein
said pressure compensation channel comprises a drilled longitudinal hole at least one of centrally or eccentrically extending in said valve piston relative to a longitudinal axis of said valve piston and comprises a transverse drilled hole extending transverse to said longitudinal axis between said drilled longitudinal hole and said annular channel; and
a check valve opening in the direction of said annular channel in said transverse drilled hole.

12. A lifting-lowering device according to claim 11 wherein
said annular channel in cross section comprises a rectilinear groove bottom, said transverse drilled hole opens into said rectilinear groove bottom; and
said annular channel has a convex course in a direction of said valve seat at a first axial end thereof and has a bevel at a second axial end with a constant gradient on an outer peripheral side of said valve piston.

13. A lifting-lowering device according to claim 8 wherein
said valve piston comprises a damping device opposite said pressure compensation channel, said damping device including an antechamber closed by an orifice disk or throttle and opening into a spring chamber having a compression spring therein forming said energy storage, said control port opening into said spring chamber in said valve housing.

14. A lifting-lowering device according to claim 13 wherein
said antechamber in said valve piston opens into a damping chamber in said valve housing via said orifice disk or throttle of said damping device.

15. A discharge pressure maintenance component, comprising:
a valve housing having a user port, a return port and a control port;
a valve piston guided for longitudinal movement in said valve housing against a force of a compression spring from an open position providing fluid communication between said user port and said return port to a closed position blocking fluid communication between said user port and said return port;

a pressure compensator conveying fluid pressure at said user port to a pressure-effective surface of said valve piston such that said valve piston reaches the open position in a pressure-balanced manner due to the force of said compression spring; and a damping device being opposite said pressure compensator and including an antechamber closed by an orifice disk or throttle and opening into a spring chamber having said compression spring therein, said control port opening in said spring chamber in said valve housing, said antechamber opening into a damping chamber in said valve housing via said orifice or throttle of said damping device.

\* \* \* \* \*